(12) United States Patent
Kobayashi et al.

(10) Patent No.: US 7,100,576 B2
(45) Date of Patent: Sep. 5, 2006

(54) FUEL INJECTION SYSTEM, METHOD, AND CONTROL APPARATUS

(75) Inventors: Fuyuki Kobayashi, Saitama (JP); Kenichi Machida, Saitama (JP); Kohsaku Murohashi, Saitama (JP); Toshinao Takigawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/050,467

(22) Filed: Feb. 3, 2005

(65) Prior Publication Data

US 2005/0178364 A1 Aug. 18, 2005

(30) Foreign Application Priority Data

Feb. 17, 2004 (JP) .............................. 2004-039613

(51) Int. Cl.
*F02M 51/00* (2006.01)
(52) U.S. Cl. ................... 123/478; 123/480; 123/492
(58) Field of Classification Search ................ 123/470, 123/478, 674, 675, 691, 480, 492, 493; 60/285
See application file for complete search history.

(56) References Cited

U.S. PATENT DOCUMENTS 5,168,701 A * 12/1992 Yamamoto et al. ........... 60/274
5,471,963 A * 12/1995 Nishioka et al. ............ 123/478
5,832,901 A * 11/1998 Yoshida et al. ............. 123/478

FOREIGN PATENT DOCUMENTS

JP 06323187 A 11/1994

* cited by examiner

*Primary Examiner*—Willis R. Wolfe
*Assistant Examiner*—Johnny H. Hoang
(74) *Attorney, Agent, or Firm*—Carrier, Blackman & Associates, P.C.; William D. Blackman; Joseph P. Carrier

(57) ABSTRACT

A fuel injection control apparatus is capable of supplying a proper amount of fuel by improving response when the throttle position is abruptly changed. The fuel injection control apparatus includes an electronic control unit for determining a fuel injection time period for a fuel injection system, based on the engine speed and the throttle position. The electronic control unit is operable to determine a base fuel injection time period based on engine speed and throttle position to start fuel injection, and adjusts the initial fuel injection time period thereafter, based on changes in the engine speed and the throttle position.

16 Claims, 11 Drawing Sheets

FUEL INJECTION SYSTEM, METHOD, AND CONTROL APPARATUS

CROSS-REFERENCE TO RELATED APPLICATIONS

The present invention claims priority under 35 USC 119 based on Japanese patent application No. 2004-039613, filed on Feb. 17, 2004. The subject matter of the above-identified priority document is incorporated by reference herein.

BACKGROUND OF THE INVENTION

1. Field of the Invention

The present invention relates to a fuel injection control system, to a fuel injection control method, and to a fuel injection control apparatus for determining a fuel injection time period in a fuel injection system.

2. Description of the Background Art

Generally speaking, fuel injection systems have been substituted for carburetors in many internal combustion engines, for reasons of improved fuel control precision, cleaner exhaust emissions, better fuel economy and the like. In recent years, fuel injection systems have been adopted in place of carburetors in many motorcycle engines.

A fuel-injected engine generally includes a control device for determining a fuel injection time period in a fuel injection system. The time period is determined based on the engine speed and the throttle position. A fuel-injected engine of this general type is disclosed in Japanese published patent document JP-A 323187/1994.

This conventional control device adjusts fuel injection flow volume in response to engine speed, and specifically, controls an energizing time period to be applied to the fuel injection system, depending on the result of a comparison between the engine speed and a predetermined speed.

In the conventional fuel injection system described above, the fuel injection time period is generally determined by an electronic control unit ECU. However, after the fuel injection time period is determined, a lag time may be required before fuel injection is actually started. Also, although the fuel injection time period is generally determined in response to throttle position, after the fuel injection time period has been determined, the conventional control device has difficulty responding quickly to changing operating conditions.

For example, when the throttle is abruptly opened, the need for fuel rapidly increases, and when the throttle is abruptly closed, the need for fuel rapidly decreases, and conventional systems experience a lag in responding to such changing conditions. This difficulty is particularly acute at low speeds, because when the throttle position is frequently opened and closed, the frequent adjustments occur during an injection interval.

A fuel control system is needed which could respond quickly to changing fuel needs of an engine, under changing operating conditions.

SUMMARY OF THE INVENTION

It is an object of the present invention to solve the above-described problems of conventional fuel injection systems, and to provide a fuel injection control apparatus capable of quickly adjusting and supplying the proper amount of fuel under changing operating conditions of a vehicle. The fuel control system hereof provides improved fuel response when the throttle is abruptly opened and the like, as well as improved response to a decrease in a required amount of fuel when the throttle is abruptly closed.

According to a first embodiment of the present invention, a fuel injection control apparatus is provided for determining a base fuel injection time period, based on engine speed and throttle position, in a fuel injection system. The control apparatus determines a base fuel injection time period to start fuel injection operation, based on the engine speed and throttle position.

The control device according to the first embodiment is also operable to adjust the base fuel injection time period, based on changes in engine speed and throttle position within a predetermined time period.

According to the present invention, the response of the fuel injection system to an abrupt change in throttle position is improved. Specifically, after the base fuel injection time period is determined to start fuel injection, if it is necessary to inject more fuel due to the throttle having been abruptly opened and the like, the required fuel can be supplied immediately. Similarly, after the base fuel injection time period is determined to start the fuel injection, if the fuel injection volume required decreases, due to the throttle being abruptly closed or the like, the fuel injection time period is quickly reduced by an appropriate amount, whereby the proper amount of the fuel is supplied to the engine.

When the engine is operating at low speed, it is possible for the control mechanism to determine a second, adjusted fuel injection time period, and based on this determination, to adjust the base fuel injection time period and derive an adjusted fuel injection time period.

When the engine is operating at low speed, the amount of interruption of a pulser or the like is small in an electronic control unit (ECU). Thus, even if the ECU is required to provide an adjusted injection time period after the base injection time period has been determined, a load on the CPU is light, and the control can be executed without placing any excessive load on the ECU.

When the engine is not operating at low speed, the control device does not determine a second, adjusted fuel injection time period, but instead injects fuel based on the base fuel injection time period.

When the engine is operating at a high speed, the amount of interruption of the pulser or the like increases in the electronic control unit ECU. In this case, since the second, adjusted injection time period is not determined, such that the fuel injection is executed in accordance with the base injection time period, the control is still executed without placing any excessive load on the electronic control unit.

Further, when the base fuel injection time period is equal to or less than a predetermined threshold value, the control device only injects the fuel after waiting a predetermined delay period.

Generally, in order to optimize the fuel supply, it is preferable to inject fuel, for example, immediately before an inlet valve for supplying required fuel is opened, using substantially the same timing as intake timing into the engine cylinder.

In the practice of the present invention, since when the first determined, base injection time period is equal to or less than a predetermined value, the injection start timing for injecting the fuel is delayed, it is possible to supply the required fuel at substantially the same timing as intake timing into the engine cylinder.

According to the present invention, it is possible to improve the fuel system response for supplying the proper amount of fuel. Improved fuel system response is required, for example, when the throttle is abruptly opened, or when the throttle is abruptly closed.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Hereinafter, a number of selected illustrative embodiments of the present invention will be described, with reference to the accompanying drawings.

Figure 1:
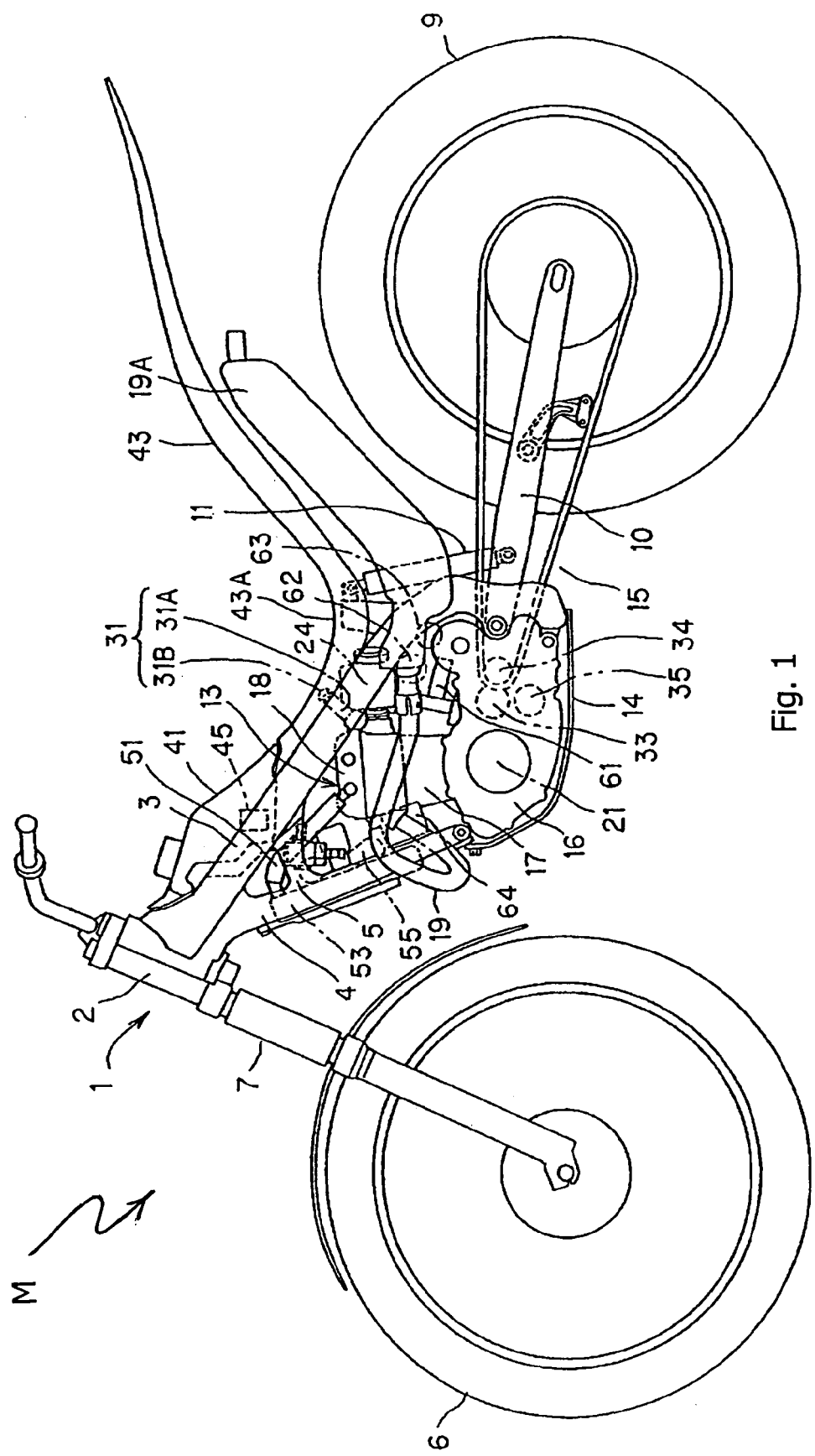
FIG. 1 is a side plan view of a motorcycle including a fuel injection system according to the present invention.
Figure 2:
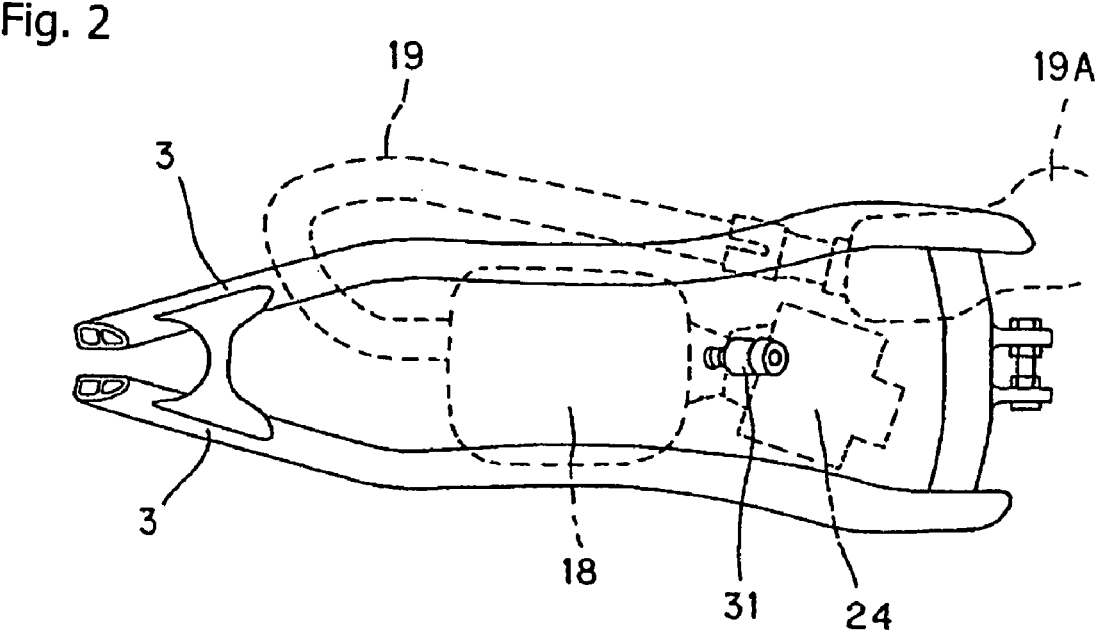
FIG. 2 is a top plan view of an isolated motorcycle body frame showing the engine in phantom, with the fuel injection device mounted thereon supported by the body frame.

FIGS. 1 and 2 show a trail-type motorcycle M intended for off-road operation. This motorcycle M is provided with a body frame 1, including a head pipe 2 arranged at the front-end portion thereof. The body frame 1 also includes a pair of main frame sections 3 extending from the head pipe 2 toward the rear of the vehicle body, and extending obliquely downwardly toward the rear, with a space left between the main frame sections 3 in the widthwise direction of the vehicle body. A pair of down tubes 4 extend obliquely downwardly below the main frame sections 3 toward the rear, with a space left therebetween in the widthwise direction of the vehicle body, in a manner similar to, but at a larger angle than, the main frame sections 3. A coupling portion 5 is provided for coupling the main frame sections 3 to the down tubes 4.

A front fork 7 is pivotally attached to the head pipe 2, for supporting a front wheel 6 in a manner so as to enable steering of the motorcycle M. A swing arm or rear fork 10, for supporting a rear wheel 9, is pivotally attached to the lower end portions of the main frame sections 3, so as to allow a reciprocal swinging motion in the up-and-down direction. A rear shock absorber 11 is interposed between the rear fork 10 and the body frame 1.

A fuel tank 41 is placed between the upper half portions of the main frame sections 3. A fuel pump 45 is mounted to the fuel tank 41.

Also, a body cover 43 is provided extending substantially continuously from the fuel tank 41, and above the lower half portion of the main frame sections 3. The body cover 43 is formed to have a central portion 43A which is positioned lower then the respective ends of the body cover 43, as shown in FIG. 1.

Figure 3:
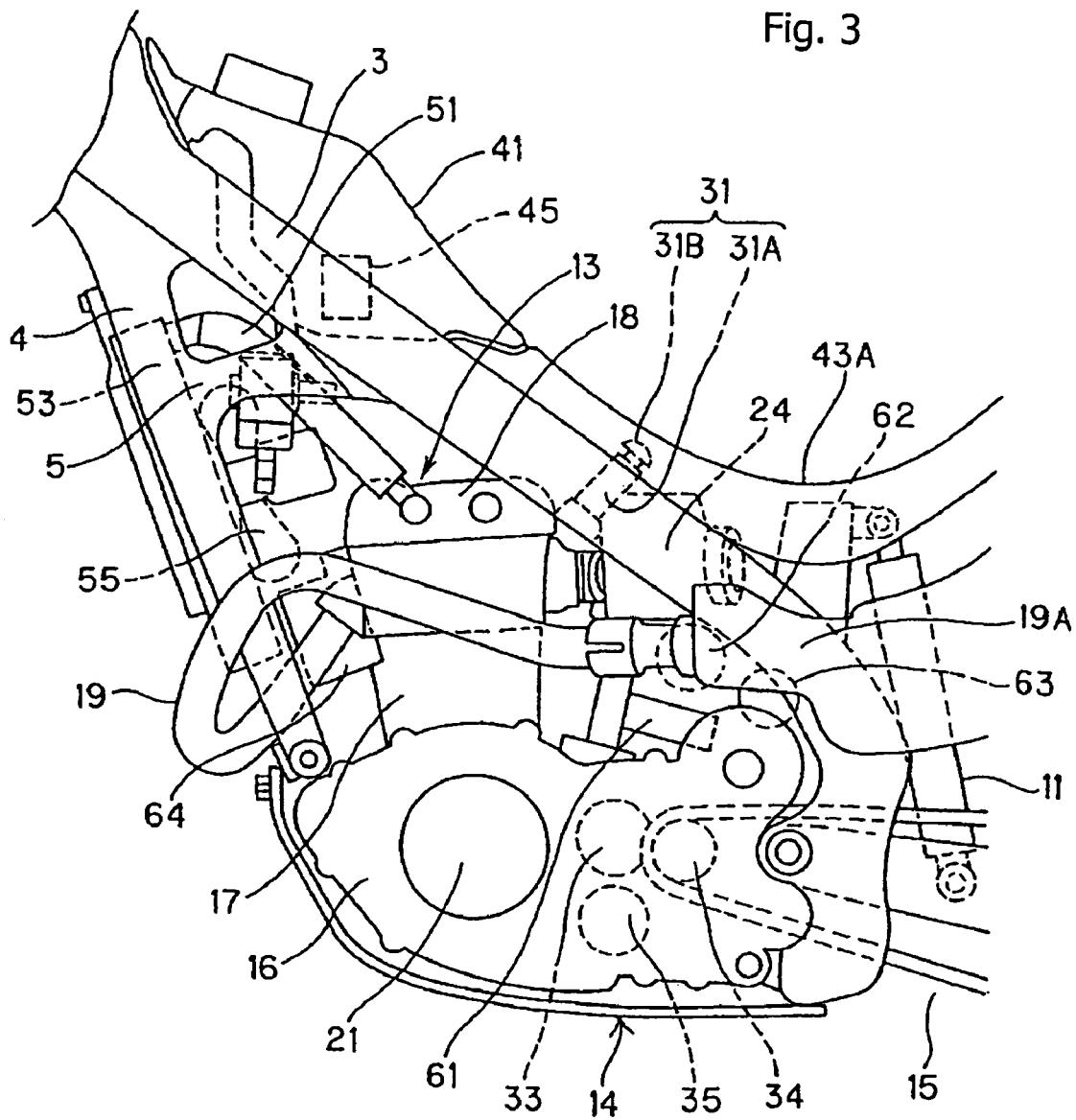
FIG. 3 is an enlarged side detail view of the motorcycle of FIG. 1, partially cut away, and showing the engine with the fuel injection device mounted thereon supported by the body frame.

A single-cylinder four-cycle engine 13 is installed between the main frame sections 3 and the down tubes 4, so as to be positioned close to an inclined portion of the body frame 1. The engine 13 is secured to the main frame sections 3 via a plurality of brackets as shown in FIG. 3, and the underside of the engine 13 is covered with an engine guard 14. The above-described engine 13 includes a cylinder block 16, a cylinder 17 and a cylinder head 18.

Power produced by the engine 13 is transmitted to the rear wheel 9 via a chain transmission system 15 (FIG. 1). An exhaust pipe 19 is connected on the front side of the cylinder head 18, and the exhaust pipe 19 passes through on the left side of the engine 13, extends toward the rear of the vehicle body, and is coupled to a muffler 19A.

Figure 4:
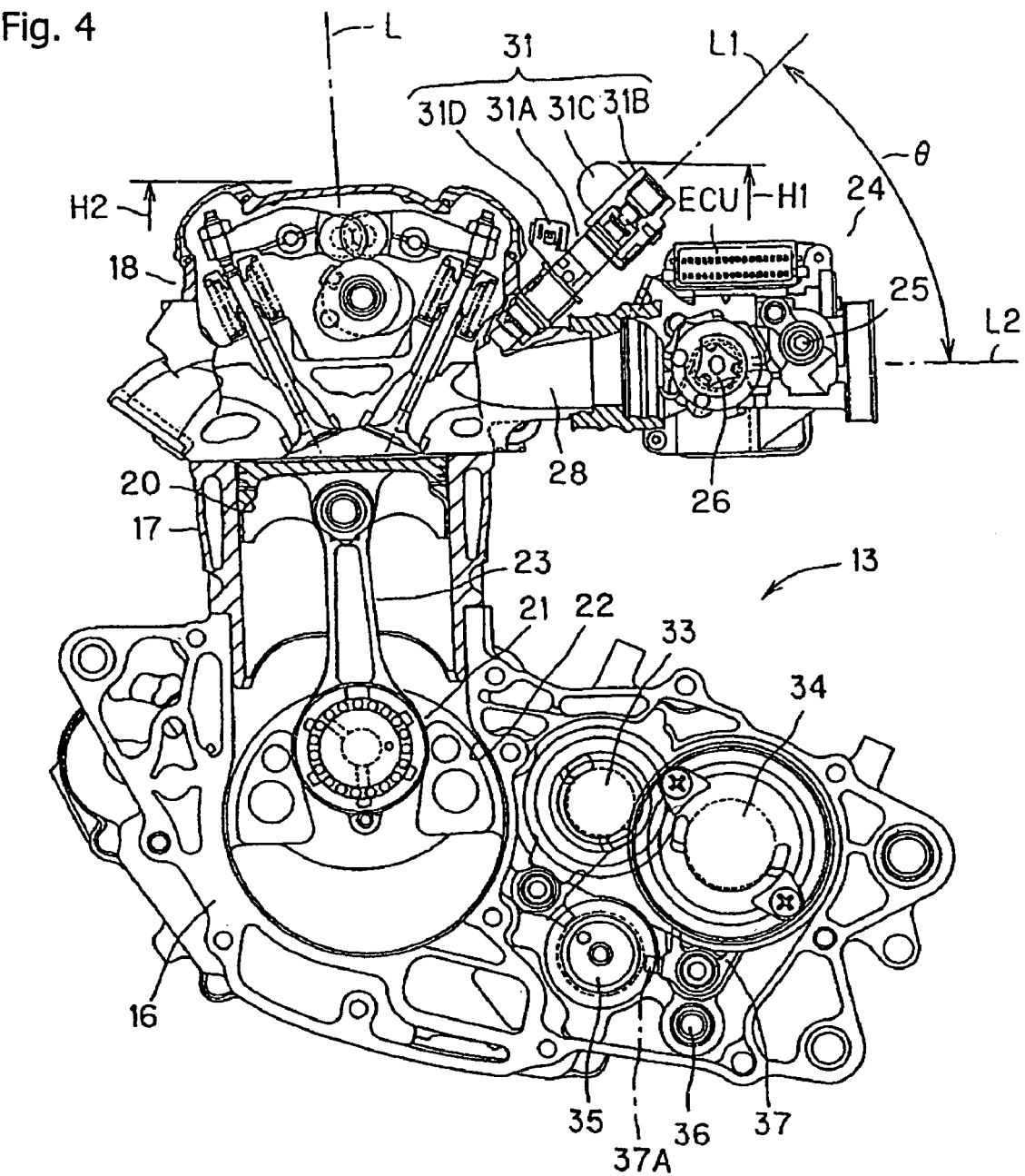
FIG. 4 is a cross-sectional view of the motorcycle engine of FIG. 3, taken along a medial vertical plane, and showing the fuel injection system mounted thereon.
Figure 5:
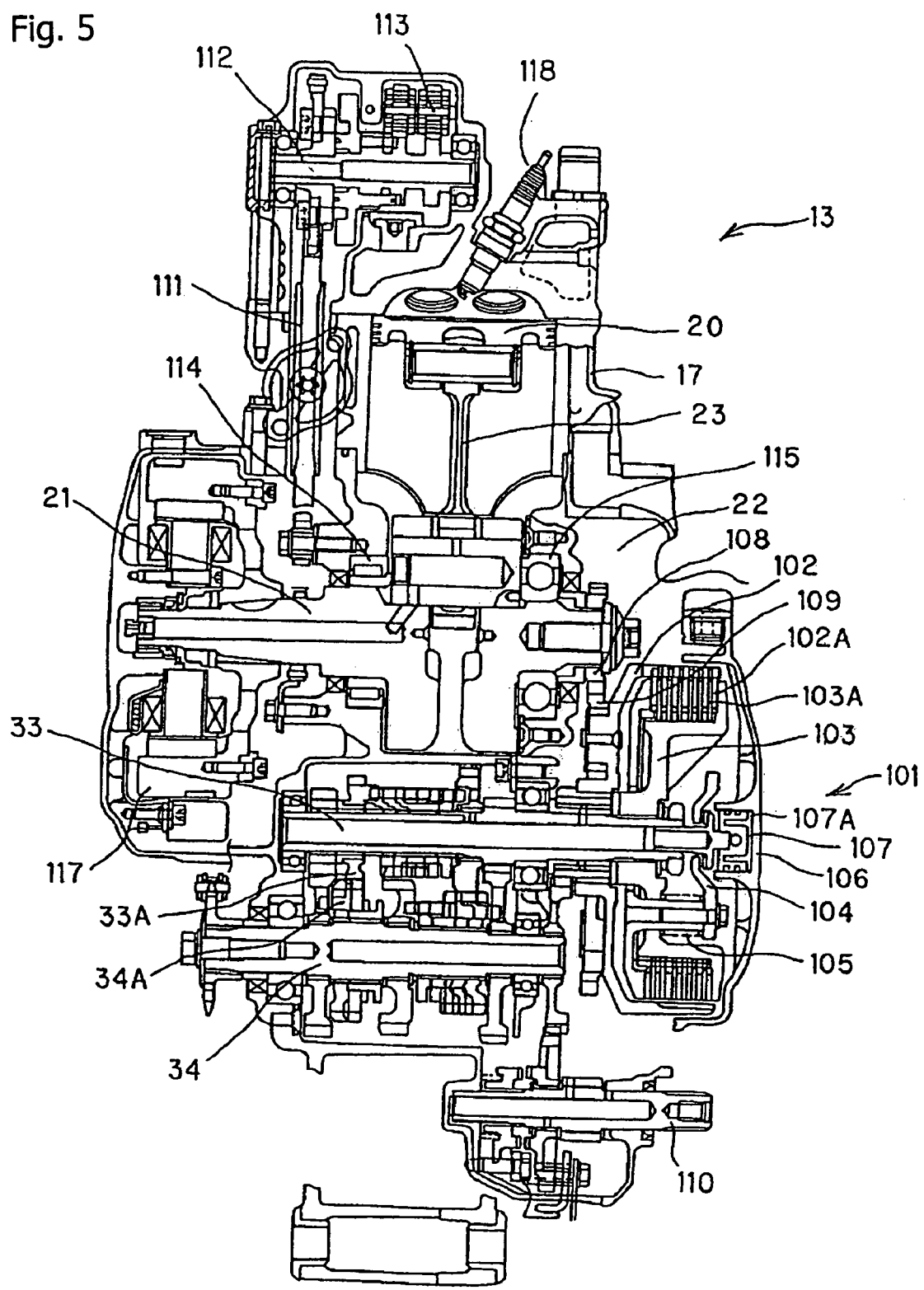
FIG. 5 is a cross-sectional view of the motorcycle engine of FIG. 3, viewed in a direction transverse to that of FIG. 3, and showing the fuel injection system mounted thereon.

A piston 20 is provided in the cylinder 17 in such a manner as to be freely reciprocally slidable therein. As shown in FIGS. 4 and 5, the piston 20 is coupled to a crankshaft 21 via a connecting rod 23, and the crankshaft 21 is axially supported on a crankcase 22.

Also, as shown in FIG. 4, a throttle body 24 is operatively attached to the backside of the cylinder head 18. The throttle body 24 has a central axis L2 oriented so as to intersect an axis L of the cylinder 17 substantially at a right angle. Clean air for combustion is supplied to this throttle body 24 via an air cleaner (not shown).

The throttle body 24 has an idling adjustment screw 25 and a throttle valve 26. When, for example, the screw 25 is turned to the right during idling adjustment, the throttle valve 26 is incrementally opened, and the amount of air supplied increases to increase the engine speed. When the screw 25 is turned to the left, the throttle valve 26 is incrementally closed, and the amount of air supplied decreases to decrease the engine speed.

The downstream portion of the throttle valve 26 intersects an intake passage 28 of the cylinder head 18, and an injector (fuel injection system) 31 intersects this intake passage 28.

The injector 31 is directly installed to the cylinder head 18 such that an axis L1 of the injector 31 is oriented at a predetermined angle (acute angle) θ, with respect to the central axis L2 of the throttle body 24. Also, as seen best in FIG. 1, the injector 31 is arranged such that the body portion 31A thereof is substantially completely overlapped by the main frame sections 3 of the motorcycle body 1, and yet a cap portion 31B of the injector protrudes above the main frame sections 3 so as to be adjacent to the underside surface of the body cover 43.

Further, the injector 31 has a connection port 31C for a fuel tube, and a fuel pump 45 is fluidly connected to this connection port 31C (See FIG. 1). The fuel pump 45 is also attached to the fuel tank 41, and fuel is supplied via this fuel pump 45.

The electronic control unit ECU is integrally mounted to the throttle body 24, and the electronic control unit ECU is also connected to a coupler 31D of the injector 31, via a signal cable (not shown).

The crankshaft 21 is mounted on the crankcase 22, as shown in FIGS. 4 and 5. The crankshaft 21 is supported on both a roller bearing 114 and a radial ball bearing 115. In addition to the crankshaft 21, the crankcase 22 supports a main shaft 33, a countershaft 34, a shift drum 35, a shift spindle 36 and a shift fork 37. These components constitute a constant-mesh type gear speed change unit (transmission). In this case, a rotating force of the crankshaft 21 is transmitted to the main shaft 33, or is cut off via a multiple-disc friction clutch 101 shown in FIG. 5.

The multiple disc clutch 101 is arranged coaxially with the main shaft 33, and is constructed by having: a clutch outer 102 having clutch disks 102A; a clutch center 103 having clutch plates 103A; a pressure plate 104 movable in the axial direction for engaging the clutch by pressing the clutch plates 103A against the clutch disks 102A; a plurality of clutch springs 105 for biasing this pressure plate 104 in a clutch engaging direction; and a clutch disengaging mechanism 106 for moving the pressure plate 104 in a clutch disengaging direction.

The clutch disengaging mechanism 106 has a release cylinder 107. The release cylinder includes a space portion 107A filled with oil that is connected to the oil cylinder connected to the clutch lever (not shown).

Other related components include a kick shaft 110; a cam chain 111; a camshaft 112; and a rocker shaft 113.

A gear 108 is affixed to the end of the crankshaft 21, on the clutch 101 side of the engine. Another gear 109 is affixed to the clutch outer disc 102 of the multiple-disc clutch 101, and engages this gear 108. Therefore, when the crankshaft 21 rotates, the clutch outer 102 always rotates via these gears 108, 109.

During clutch engagement, the pressure of the oil, with which the space portion 107A of the release cylinder 107 has been filled, presses the pressure plate 104 in the direction of the left side of the drawing, and a biasing force of the clutch spring 105 presses the clutch center 103 in the direction of the left side of the drawing, whereby the clutch plate 103A is pressed against the clutch disk 102A. In this state, a rotating force of the crankshaft 21, transmitted to the clutch outer 102 via the above-described gears 108, 109, is further transmitted to the clutch center 103 via the clutch disk 102A and the clutch plate 103A, and is transmitted to the main shaft 33 via this clutch center 103.

When the clutch has been disengaged by operating the clutch lever (not shown), the oil, with which the space portion 107A has been filled, escapes on the oil cylinder side connected to the clutch lever. Thereby, the pressure plate 104 moves in the direction of the right side of the drawing, the biasing force of the clutch spring 105 becomes weaker, and a press contact state between the clutch disk 102A and the clutch plate 103A is released. When press contact state is released, the clutch center 103 idles to cut off the transmission of power to the main shaft 33.

The rotating force is transmitted from the crankshaft 21 to the main shaft 33 is transmitted to the counter shaft 34 after its speed is changed into, for example, first speed, second speed or third speed via the gear speed change unit. The rotating force is transmitted to an output shaft (not shown) coupled to the counter shaft 34 via a gear, and is transmitted to the rear wheel 9 from the output shaft via the chain transmission system 15 as power of the engine 13.

A change pedal (not shown) fitted to the crankcase of the motorcycle is operated to the speed into, for example, first speed, second speed or third speed. Prior to operation of the change pedal, the clutch lever (not shown) is operated to disconnect the crankshaft 21 and the main shaft 33 via the multiple disc clutch 101. Next, while in the disconnected state, the change pedal is operated. This change pedal is coupled to the shift spindle 36 shown in FIG. 4. When the change pedal is operated, the shift spindle 36 rotates, and in synchronization therewith, the shift drum 35 rotates via a gear mechanism (not shown). This rotation slides either of the shift forks 37 in the axial direction via a shift pin 37A engaged with a groove (not shown) of the shift drum 35. The operated shift fork 37 moves either gear 34A (FIG. 5) on the counter shaft 34 in the axial direction to engage either gear 33A (FIG. 5) on the main shaft 33.

A gear ratio is determined by gears to be engaged each other. The rotating force, transmitted from the crankshaft 21 to the main shaft 33, is transmitted to the counter shaft 34 after its speed is changed into first speed, second speed or third speed in accordance with its gear ratio via the gear speed change unit. The rotating force is transmitted to an output shaft (not shown) coupled to the counter shaft 34 via a gear; and is transmitted to the rear wheel 9 from the output shaft via the chain transmission system 15 as power of the engine 13.

The above-described engine is a water-cooled engine. Referring to FIG. 1, one end of a pair of hoses 51 is connected to a water jacket of the cylinder head 18. The other end of each hose 51 is connected to a radiator 53 supported between the down tubes 4. The cooling system includes a radiator fan 55. Driven by the engine, a water pump (not shown) circulates cooling water, that has cooled the engine via the water jacket, to the radiator 53. Water cooled within the radiator is then re-circulated to the water jacket.

An alternator 117 (FIG. 5) is coupled to the above-described engine. Two capacitors 62, 63 are connected to this alternator 117 via a regulator 61. Each respective capacitor 62, 63 has a different use. Specifically, one capacitor 62 is connected to a spark plug 118 (FIG. 5) of the engine 13 via an ignition coil 64. A voltage boosted by an ignition coil 64 is applied to the spark plug 118. The other capacitor 63 is connected to the above-described injector 31 and fuel pump 45, and is used for a fuel injection system.

Both capacitors 62, 63 are provided at the lower end portion of the main frame sections 3, such that one part overlaps or is flush with the underside of the lower end portion, whereby the layout efficiency is improved. By dividing the capacitor function into two separate capacitors 62, 63, the fuel injection system hereof is able to perform control that is substantially unaffected by noise from the ignition coil 64.

Figure 6:
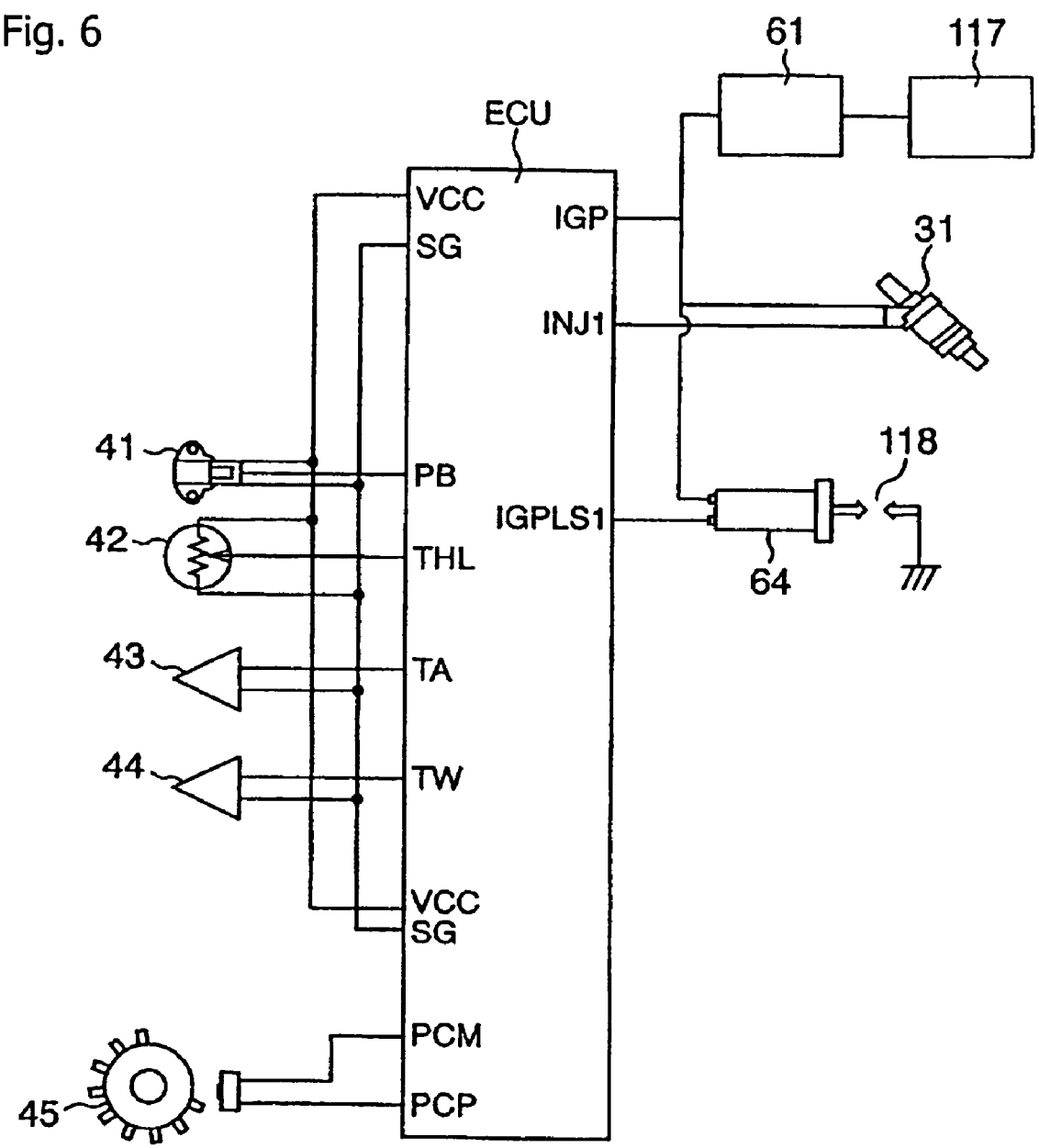
FIG. 6 is a schematic block diagram of the electronic control unit (ECU) showing sensor inputs into the ECU as well as connections to the regulator, fuel injector, and ignition.

The above-described electronic control unit ECU, as shown in FIG. 6, is connected to a plurality of sensors, including a negative pressure sensor 41, a throttle position sensor 42, an intake temperature sensor 43, an engine cooling water temperature sensor 44, and an engine speed sensor (crank angle sensor) 45. The ECU is also connected with the alternator 117 and a regulator 61. Further, the above-described injector 31 is connected to the ECU via a signal cable, and the ignition coil 64 and the spark plug 118 are also connected to the ECU.

The above-described engine 13 is a single-cylinder four-cycle engine, and in this case, the electronic control unit ECU determines fuel injection volume every two revolutions (720°) of the crankshaft 21, transmits the result to the injector 31, and injects the fuel into the intake passage 28 of the cylinder head 18 only for a time period corresponding to a selected fuel injection volume.

Figure 7:
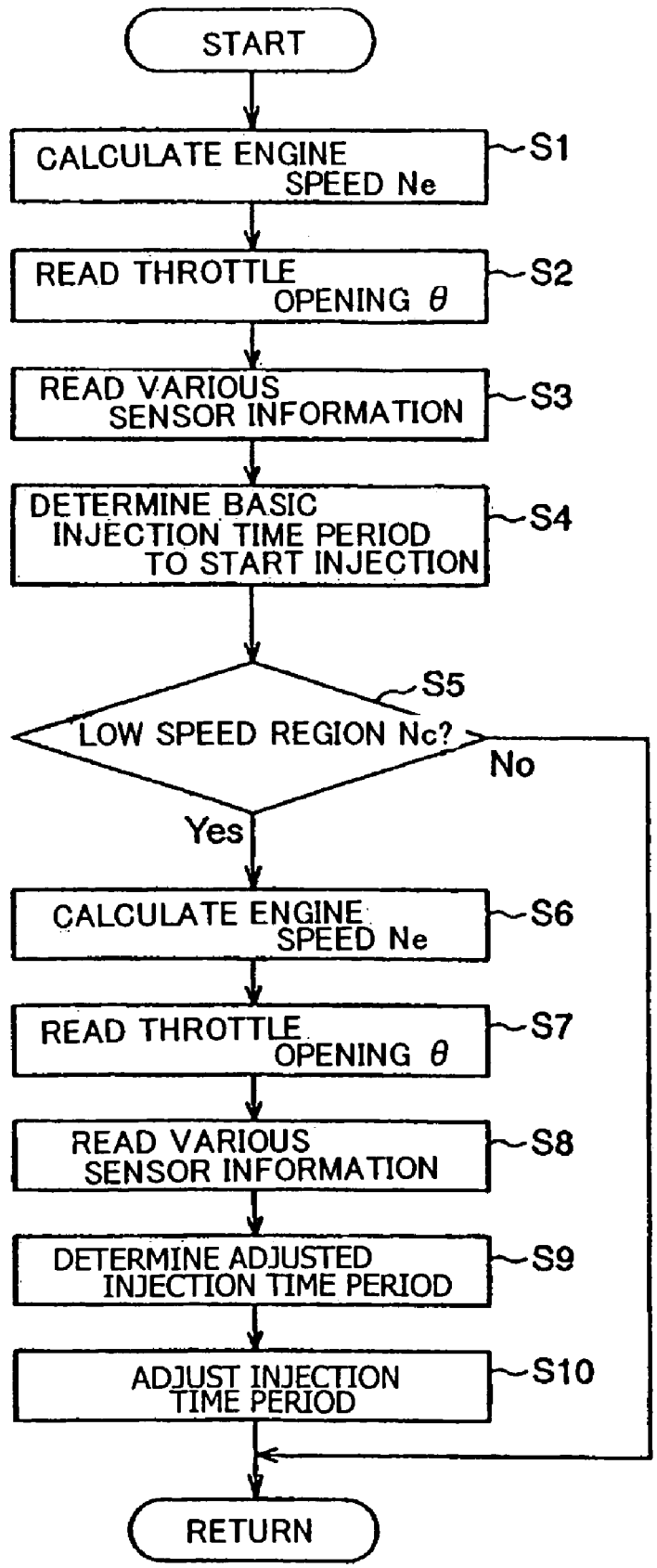
FIG. 7 is a flow chart showing a process for determination of a base injection time period, and for determination of an adjusted injection time period at low engine speeds.

FIG. 7 is a flow chart describing a process for determining a fuel injection time period.

In first step (S1) of this process, the electronic control unit ECU calculates engine speed Ne based on information from the engine speed sensor 45. In the second step (S2), the ECU reads the throttle position θ from the throttle position sensor 42. The ECU further reads various other sensor information (for example, information based on the negative pressure sensor 41, the intake temperature sensor 43, the engine cooling water temperature sensor 44 and the like) in step (S3).

Thus, based on the engine speed Ne, the throttle position θ, and various additional sensor information, the electronic control unit ECU calculates the fuel injection time period (hereinafter, referred to as the base injection time period) corresponding to the first fuel injection volume to start fuel injection, in accordance with step (S4).

Next, at step (S5), the electronic control unit ECU judges whether or not the engine speed Ne is within a low speed region NC. If the engine speed is within the low speed region NC, at step (S6) the electronic control unit ECU calculates the engine speed Ne again at a predetermined time within a predetermined time period. Note that during this calculation, fuel injection proceeds in accordance with the base injection time period. Then, at step (S7), the ECU reads the throttle position θ. Subsequently, at step (S8), the ECU reads various sensor information. Thus, at step (S9), based on the engine speed Ne, throttle position θ and various sensor information, the electronic control unit ECU calculates a second fuel injection time period (hereinafter referred to as the adjusted injection time period).

The fuel injection time period is generally determined based on the engine speed Ne and the throttle position θ. Since, however, intake air volume of the engine, responsive to the throttle position θ, varies with engine operating conditions, the intake air volume is, in the present structure, determined after the information of the throttle position θ is adjusted based on various sensor information.

Next, based on the adjusted injection time period determined in step (S9), the base injection time period is modified, step (S10). In this adjustment process, the base injection time period determined may be renewed as the adjusted injection time period.

Figure 8:
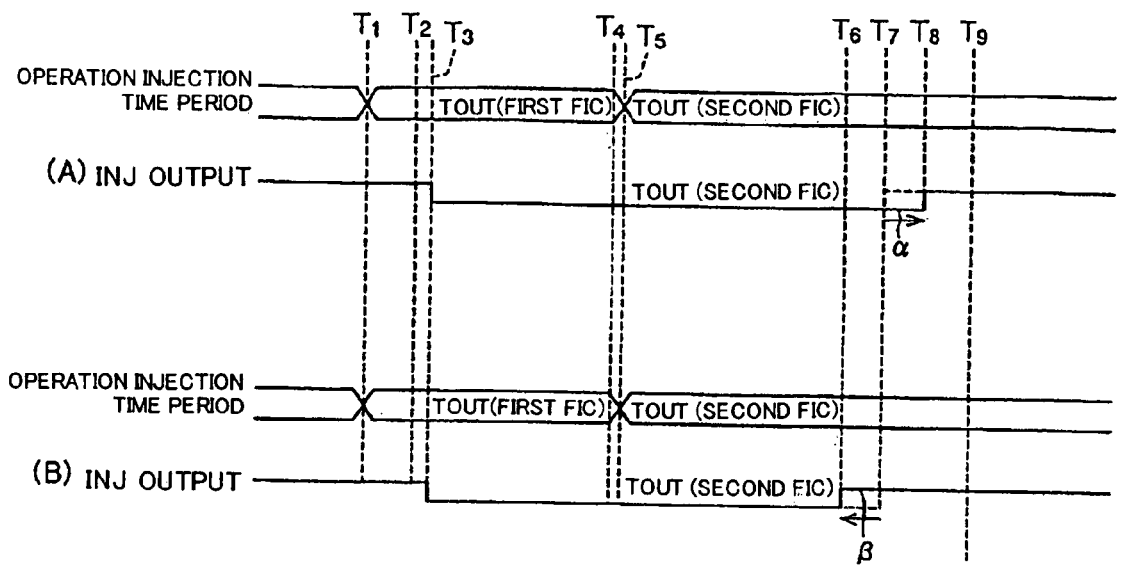
FIG. 8A is a chart showing injector output over time for a case where the engine is operating at a low speed and the base injection time period is less than the adjusted injection time period.
FIG. 8B is a chart showing injector output over time for the case wherein the engine is operating at a low speed and the first determined injection time period is greater than the adjusted injection time period.

FIG. 8 is a time chart showing adjustment of injector output over time. FIG. 8A shows injector output for a case where the engine is operating at a low speed and the first determined, base injection time period is less than the adjusted injection time period. In this case, at time T1, the base injection time period is determined; at time T2, a first injection timer is set; and at time T3, slightly delayed from setting of the first injection timer, fuel injection by the injector 31 is started. In this case, the base injection time period is from time T3 to time T7.

Next, at a predetermined time, that is, at time T4, the adjusted injection time period is determined. At time T5, a second injection timer is set. If the adjusted injection time period at this time is from time T3 to time T8, in step (S10) in FIG. 7, the base injection time period is extended by a time period α. Time period α corresponds to the difference in time of injection periods between the basic and adjusted time periods. In this case, the predetermined time can be set by linking with the crank angle of the crankshaft 21. Time T9 is a limit for completion of injection.

Accordingly, even if after the base injection time period is determined and fuel injection is started, it becomes necessary to inject more fuel (for example, due to the throttle position being abruptly opened or for any other reason), it is possible to supply the shortage immediately, and thus it is possible to improve response to rapid changes in fuel supply requirements.

FIG. 8B shows injector output for a case where the engine is operating at a low speed and the first determined, base injection time period is greater than the adjusted injection time period. In this case, at time T1, the base injection time period is determined; at time T2, a first injection timer is set; and at time T3, slightly delayed from time of setting the first injection timer, fuel injection by the injector 31 is started. The base injection time period in this case is from time T3 to time T7.

Next, at a predetermined time, that is, at time T4, the adjusted injection time period is determined, and at time T5, a second injection timer is set. If the adjusted injection time period at this time is from time T3 to time T6, in step (S10) in FIG. 7, the base injection time period is shortened by a time period β. The time period β corresponds to the difference in time of injection periods between the base and adjusted time periods. Time T9 is the limit for completion of injection.

Accordingly, even after the base injection time period is determined and fuel injection is started, if the required fuel injection volume is reduced due to the throttle position being abruptly closed or the like, the system hereof is able to supply the proper amount of fuel, by shortening the injection time period.

The above-described motorcycle is a trail vehicle for a competition, and in this case, particularly when the engine speed is within a low speed region, the throttle position is frequently opened and closed by a rider. In the present embodiment, even for such trail motorcycle, the fuel injection control apparatus sufficiently responds to the rider's operating request.

On the other hand, if at step (S5) in FIG. 7, it is determined that the engine speed is not within a low speed region NC, that is, when the engine is operating at a high speed, the fuel injection is executed based on the first determined, base injection time period, and such determination and of the adjusted injection time period, as shown in steps S6 to S9, will not be executed.

Figure 9:
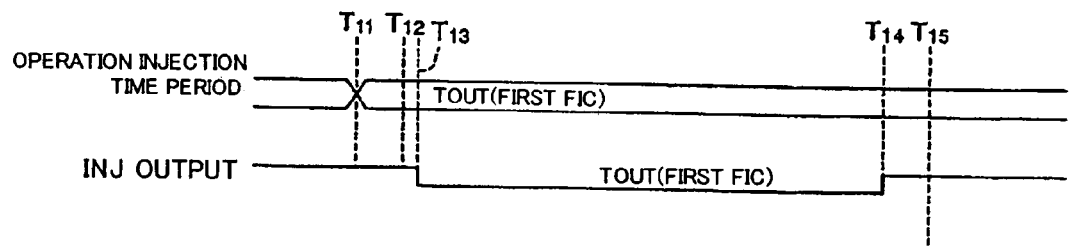
FIG. 9 is a chart showing injector output over time for the case wherein the engine is operating at a high speed.

FIG. 9 is a time chart showing injector output over time for a case where the engine is operating at a high speed. At time T11, the base injection time period is determined; at time T12, the first injection timer is set; and at time T13, which is slightly delayed from time of setting the first injection timer, the fuel injection by the injector 31 is started. The base injection time period is from time T13 to time T14. When the engine speed is within a high speed region, the second, adjusted injection time period is not determined, but instead at time T14, the fuel injection by the injector 31 is ended. Time T15 is the limit for completion of injection.

Accordingly, when the engine speed is operating within a high speed region, the second adjusted injection time period is not determined, and thus a load on the electronic control unit ECU, which is operating under high speed conditions in which an amount of interruption of pulser or the like increases, can be restricted.

Figure 10:
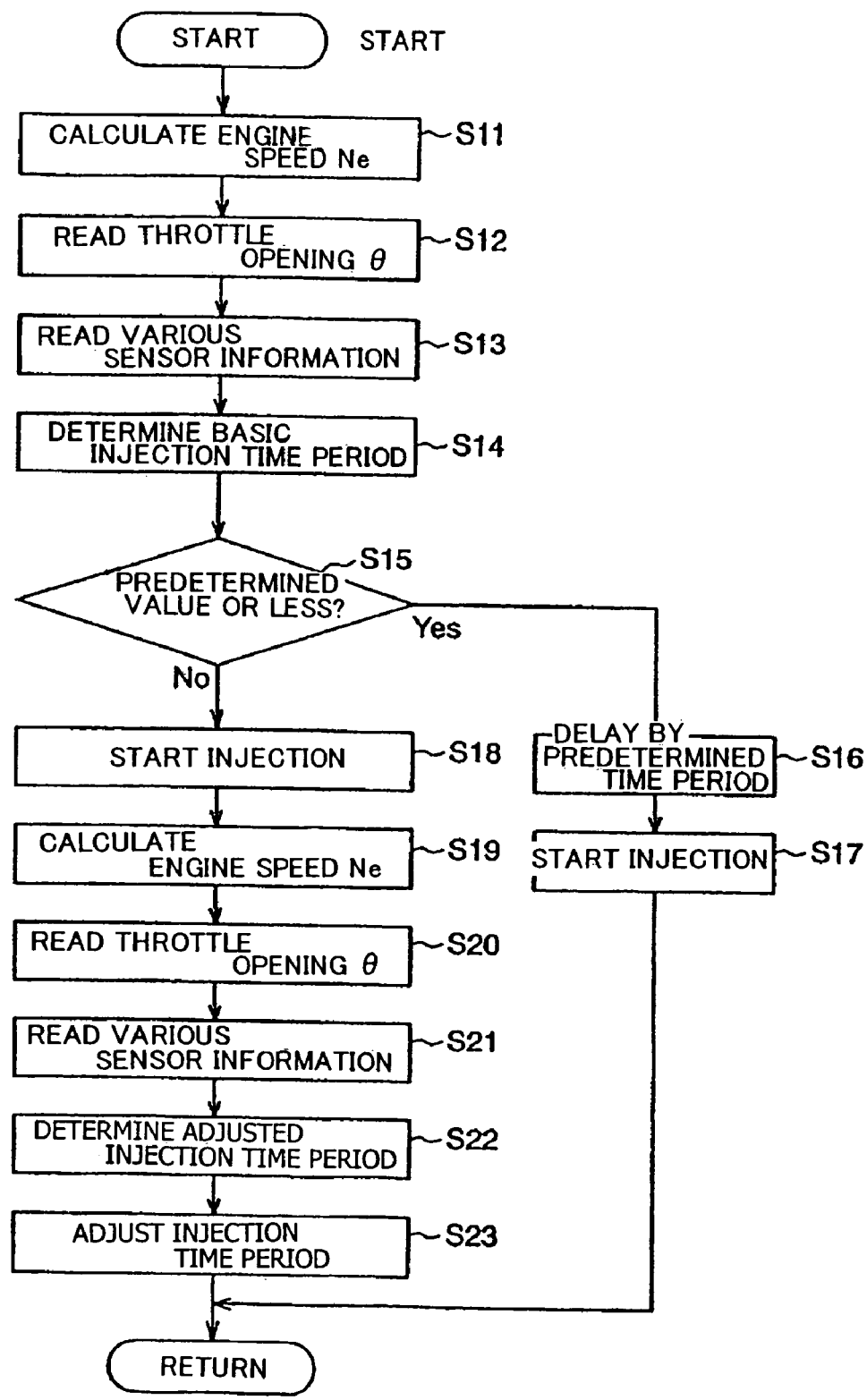
FIG. 10 is a flow chart showing a process for determination of an injection time period for a second embodiment of the invention.

FIG. 10 is a flow chart describing a process for determining a fuel injection time period according to a second embodiment of the present invention.

In this case, when the first determined, base fuel injection time period is equal to or less than a predetermined value, the second adjusted injection time period is not determined, and the fuel injection will be executed based on first determined, base fuel injection time period after being delayed by a predetermined time period.

In other words, in FIG. 10 and at step (S11), the electronic control unit ECU calculates engine speed Ne. At step S12, the ECU reads throttle position θ, and further at step (S13) reads various sensor information. Thus, at step (S14), based on the engine speed Ne, the throttle position θ and various sensor information, the electronic control unit ECU determines the first base injection time period.

Next, at step (S15), the electronic control unit ECU judges whether or not the first base injection time period is equal to or less than a predetermined value. When the first base injection time period is equal to the predetermined value or less, the process proceeds to step (S16). At step (S16), the start of fuel injection is delayed by a predetermined time period that has been set in advance. Next, at step (S17), fuel injection is started in compliance with the base injection time period, and the injection is executed in accordance with the base injection time period.

However, if at step (S15) the first base injection time period exceeds the predetermined value, the process proceeds to step (S18). At step (Si8), the fuel injection is started in accordance with the first base injection time period. Then, at step (S19), as in the case of the above-described embodiment, the electronic control unit ECU calculates the engine speed Ne, again at a predetermined time within a predetermined time period during fuel injection in compliance with the base injection time period. At step (S20), the ECU reads the throttle position θ, and at step (S21), the ECU reads various sensor information. Further, at step (S22), based on the engine speed Ne, throttle position θ and various sensor information, the electronic control unit ECU determines a second adjusted fuel injection time period. At step (S23), the ECU adjusts the base injection time period determined at step (S14) based on the adjusted injection time period determined in step (S22), in accordance with similar processing to the above-described adjustment processing. In this adjustment processing, the first determined, base injection time period may be renewed by the adjusted injection time period.

Figure 11:
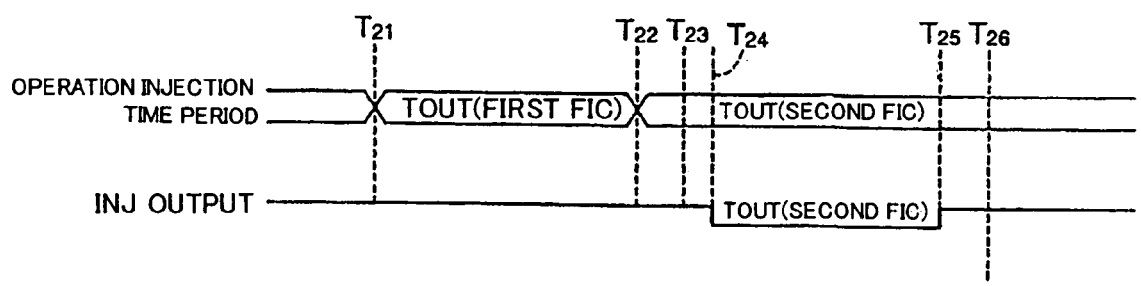
FIG. 11 is a chart showing injector output over time for the second embodiment of the invention.

FIG. 11 is a chart showing injector output over time for the second embodiment of the invention as illustrated in FIG. 10. At time T21, the base injection time period is determined, and it is judged whether or not the base injection time period is a predetermined value or less.

When the base injection time period is the predetermined value or less, the adjusted injection time period is not determined. Thus, after being delayed for a predetermined time period, at time T24, injection in compliance with the base injection time period is started, and at time T25, the injection is completed. Time T26 is the limit for completion of injection. Delay time periods from time T21 to time T24 in this case substantially correspond to a total amount of a time period T22 corresponding to determination of the adjusted injection time period, a time period T23 corresponding to setting of the injection timer, and a slightly delayed time period T24 in the above-described embodiment.

In the second embodiment hereof, since when the base injection time period is the predetermined value or less, the fuel injection start is delayed until at least after a time at which the adjusted injection time period should be primarily determined, the fuel can be supplied into the cylinder of the engine 13 at the substantially same timing as intake timing. Therefore, immediately before the inlet valve of the cylinder head 18 is opened, the fuel injection is executed, thereby optimizing the fuel supply.

Figure 12:
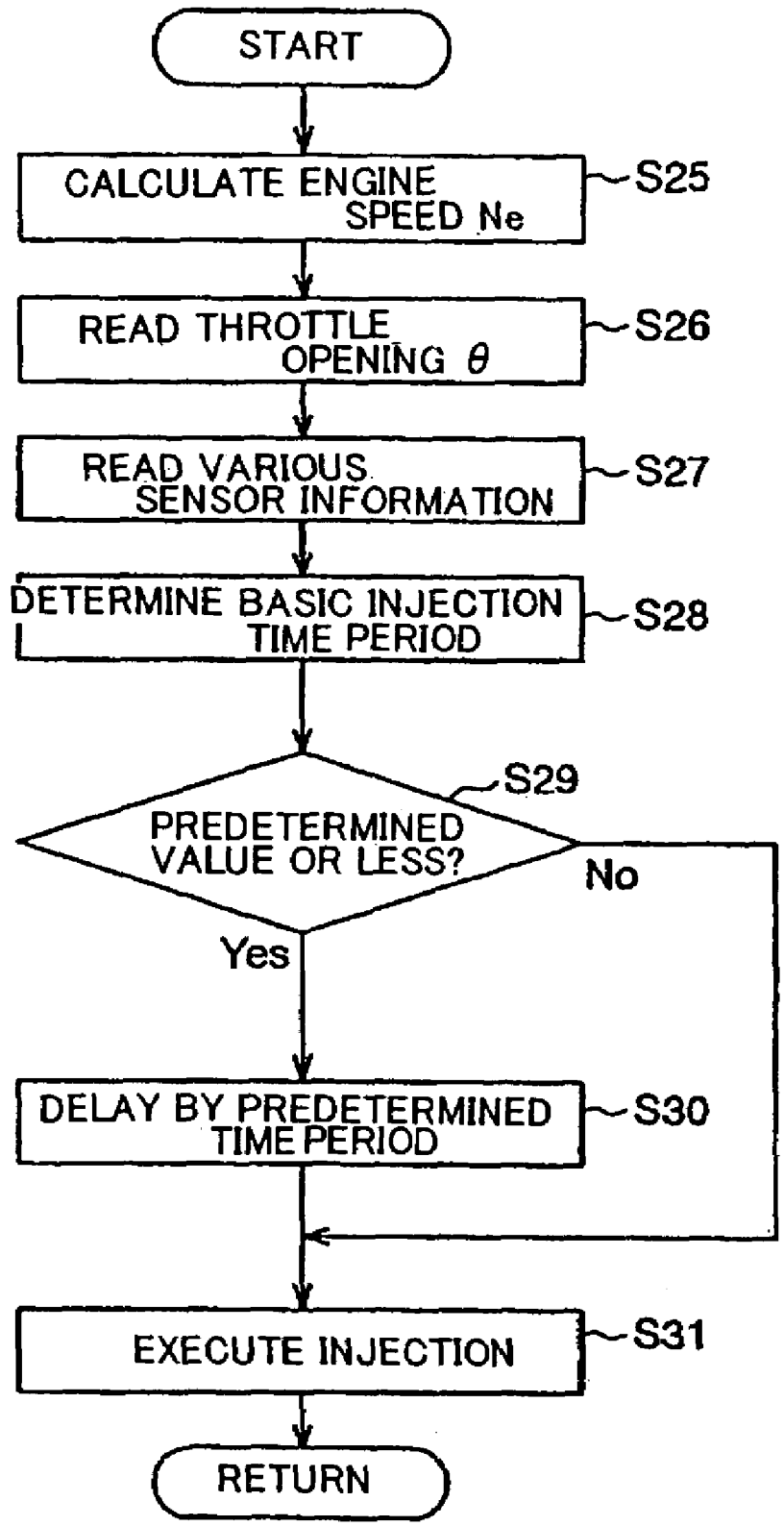
FIG. 12 is a flow chart showing a process for determination of an injection time period for a third embodiment of the invention.

FIG. 12 is a flow chart showing a process for determination of an injection time period according to a third embodiment of the invention. In the third embodiment, at step (S25), the electronic control unit ECU calculates engine speed Ne. At step (S26), the electronic control unit ECU reads throttle position θ, and further at step (S27), reads various sensor information. Thus, as step (S28), based on the engine speed Ne, the throttle position θ and various sensor information, the electronic control unit ECU determines the first base injection time period.

Next, at step (S29), the electronic control unit ECU judges whether or not the first base injection time period is equal to a predetermined value or less. When the base injection time period is equal to the predetermined value or less, the process is transferred to step (S30). At step (S30) the start of fuel injection is delayed for a predetermined time period that has been set in advance, and then at step (S31) fuel injection in compliance with the base injection time period is started, and the injection is executed in accordance with the base injection time period. Delay time periods in this case can be set to substantially correspond to a total amount of a time period T22 corresponding to determination of the adjusted injection time period, a time period T23 corresponding to setting of the injection timer, and a slightly delayed time period T24 in the above-described embodiment.

When in step (S29), the first base injection time period exceeds the predetermined value, the process is transferred to step (S31). At step (S31), the fuel injection is started in accordance with the first base injection time period without delaying the injection start time.

Accordingly, since when the base injection time period is the predetermined value or less, the injection start is delayed by the predetermined time period, the fuel can be supplied into the cylinder of the engine 13 at the substantially same timing as intake timing. Therefore, immediately before the inlet valve of the cylinder head 18 is opened, the fuel injection is executed, thus optimizing the fuel supply.

Although the description of the present invention has been made herein based on a number of selected illustrative embodiments, the present invention is not limited to the described embodiments. In the adjustment of the base injection time period of the above-described embodiment, the adjusted injection time period is determined, and the base injection time period is adjusted by comparing with the adjusted injection time period. However, the base injection time period may be adjusted by directly comparing, for example, the first and second engine speeds Ne and throttle positions θ without determining the adjusted injection time period. Also, in the above-described embodiments, when completion of the fuel injection exceeds the limit for completion of injection, control for completing this fuel injection is executed before the limit for completion of injection.

While a number of illustrative examples of the present invention have been described above, the present invention is not limited to the working examples described above, but various design alterations may be carried out without departing from the present invention as set forth in the claims.

We claim:

1. A fuel injection volume control apparatus for an engine having a throttle position sensor which senses a throttle position and an engine speed sensor which senses an engine speed, the fuel injection volume control apparatus comprising a control device for determining a fuel injection time period in a fuel injection system based on engine speed and throttle position wherein said control device is operable to:

determine a first fuel injection time period on the basis of the engine speed and the throttle position at a first time, and adjust the first fuel injection time period on the basis of changes in the engine speed and the throttle position within a predetermined time period.

2. The fuel injection volume control apparatus according to claim 1, wherein when said engine is operating at a speed lower than a threshold speed, said control device determines a second fuel injection time period, and adjusts the first fuel injection time period to correspond to the second time period.

3. The fuel injection volume control apparatus according to claim 1, wherein when said engine speed is at or above a threshold speed, said control device does not adjust the first fuel injection time period, but injects the fuel on the basis of the first fuel injection time period.

4. The fuel injection volume control apparatus according to claim 1, wherein said control device is operable to delay initiation of the fuel injection time period by a predetermined delay period, when the first fuel injection time period is less than or equal to a predetermined value.

5. In an engine comprising a fuel injection system, an engine speed sensor which senses an engine speed and a throttle position sensor which senses a throttle position, the improvement in the engine comprising a fuel injection control apparatus, the fuel injection control apparatus comprising an electronic control unit, the electronic control unit operable to determine a fuel injection time period for the fuel injection system on the basis of inputs from the engine speed sensor and throttle position sensor wherein the electronic control unit device is operable to:

determine a first thai injection time period on the basis of the engine speed and the throttle position at a first time, and adjust the first Fuel injection time period on the basis of changes in the engine speed and the throttle opening after a predetermined time period has elapsed from the first time.

6. The engine of claim 5, wherein the fuel injection control apparatus is operable to control fuel injection volume using a first control procedure when the engine is operating at or below a threshold engine speed, and using a second control procedure when the engine is operating above the threshold engine speed.

7. The engine of claim 6, wherein the first control procedure comprises said electronic control unit determining a second fuel injection time period, and on the basis of this determination, adjusting the first fuel injection time period to correspond to the second fuel injection time period.

8. The engine of claim 6, wherein the second control procedure comprises said electronic control unit operating using the first fuel injection time period without correction.

9. The engine of claim 5, wherein the engine comprises a cylinder head and the throttle is mounted to the cylinder head so as to extend outwardly therefrom;

wherein the fuel injector system comprises a fuel injector aligned along a first axis, the fuel injector mounted directly to the cylinder head such that the first axis lies at an acute angle with respect to a second axis which is aligned with the throttle;

and wherein,the electronic control unit is operatively attached to the throttle.

10. The engine of claim 5, wherein the engine comprises a spark plug, an ignition coil, an alternator, a first capacitor and a second capacitor; and wherein:

the alternator is connected to bath the first capacitor and the second capacitor, the first capacitor is connected to the spark plug via the ignition coil, and the second capacitor is connected to the fuel injection system, such that the fuel injection system is substantially shielded from electronic noise generated by the ignition coil.

11. A method of controlling operation of a fuel injection system in an engine, wherein the fuel injection system comprises a control device, said method comprising the steps of:

1) determining a base time period;
2) initiating fuel flow through at least one fuel injector and maintaining the fuel flow for the base time period;
3) determining within the base time period an adjusted injection time period based on input from selected engine sensors; and
4) adjusting the length of the base time period during the base time period to correspond to the adjusted injection time period while maintaining fuel flow through said at least one fuel injector.

12. A method of controlling operation of a fuel injection system in an engine, wherein the fuel injection system comprises a control device, said method comprising the steps of:

1) determining a base time period;
2) initiating fuel flow through at least one fuel injector and maintaining the fuel flow for the base time period;
3) determining an adjusted injection time period based on input from selected engine sensor; and
4) maintaining fuel flow through said at least one fuel injector for the adjusted injection time period, wherein the fuel injection system comprises an engine speed sensor, a throttle position sensor, an intake temperature sensor and an engine cooling water temperature sensor, and wherein the step of determining a base time period is achieved by calculating the initial engine speed based on initial information from the engine speed sensor, calculating the initial throttle opening based on initial information from the throttle position sensor, calculating the initial engine operating conditions based on initial information from engine sensors including the intake temperature sensor and the engine cooling water temperature sensor, determining the base time period based on the calculated initial engine speed, the calculated initial throttle opening, and the calculated initial engine conditions.

13. The method of controlling fuel injection of claim 12 wherein the fuel injection system comprises an engine speed sensor, a throttle position sensor, an intake temperature sensor and an engine cooling water temperature sensor, and wherein the step of determining a corrected injection time period is achieved by calculating the changed engine speed based on updated information from the engine speed sensor, calculating the changed throttle opening based on updated information from the throttle position sensor, calculating the changed engine operating conditions based on changed information from engine sensors including the intake temperature sensor and the engine cooling water temperature sensor, determination of the corrected injection time period based on the calculated changed engine speed, the calculated changed throttle opening, and the calculated changed engine conditions.

14. The method of controlling fuel injection of claim 12 wherein the following method step is inserted after method step 2:

determining whether the engine is operating at a low engine speed, wherein if the engine is operating at a low engine speed, method steps 3 and 4 are executed, and wherein if the engine is operating at a high engine speed, method steps 3 and 4 are omitted.

15. The method of controlling fuel injection of claim 12 wherein the following method step is inserted after method step 1:

determining whether the base time period is equal to or less than a predetermined value, wherein if the base time period is equal to or less than a predetermined value, the start of fuel injection is delayed by a predetermined time period, and subsequent to the predetermined time period fuel injection is started, and wherein the base time period is greater than a predetermined value, method steps 2, 3, and 4 are executed.

16. The method of controlling fuel injection of claim 12 wherein the following method step is inserted after method step 1:

determining whether the base time period is equal to or less than a predetermined value, wherein if the base time period is equal to or less than a predetermined value, the start of fuel injection is delayed by a predetermined time period, and subsequent to the predetermined time period fuel injection is started, and wherein if the base time period is greater than a predetermined value, method step 2 is executed, and method steps 3 and 4 are omitted.

* * * * *